J. PIERSON, Jr.
AGRICULTURAL IMPLEMENT.
APPLICATION FILED MAY 28, 1908.

904,498.

Patented Nov. 17, 1908.

Attest:
Inventor:
John Pierson Jr.

UNITED STATES PATENT OFFICE.

JOHN PIERSON, JR., OF ASHLEY, OKLAHOMA.

AGRICULTURAL IMPLEMENT.

No. 904,498.

Specification of Letters Patent.

Patented Nov. 17, 1908.

Application filed May 28, 1908. Serial No. 435,520.

*To all whom it may concern:*

Be it known that I, JOHN PIERSON, Jr., a citizen of the United States, residing at Ashley, Oklahoma, have invented certain new and useful Improvements in Agricultural Implements, of which the following is a specification.

My invention relates to an improved farming implement designed for use in cultivating the soil and cutting weeds and, while especially adapted for use in connection with cultivation of corn is not limited to such use.

I have aimed to produce an implement which will loosen up the sub-soil between the rows of plants and leave the surface free from ridges or furrows and in a condition to retain the moisture which is in the ground while at the same time falling rain will soak into the ground and settle around the plant roots.

I have further aimed to provide a device which may be easily manipulated, will be free from side draft and which will serve effectually to cut off the roots of all weeds.

An embodiment of my invention is illustrated in the accompanying drawings, in which,—

Figure 1:
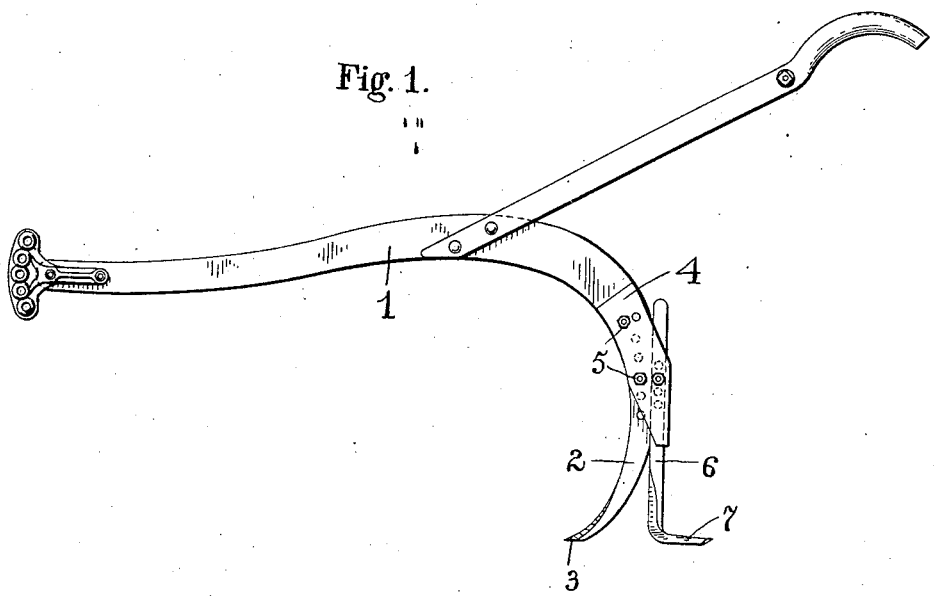
Figure 2:
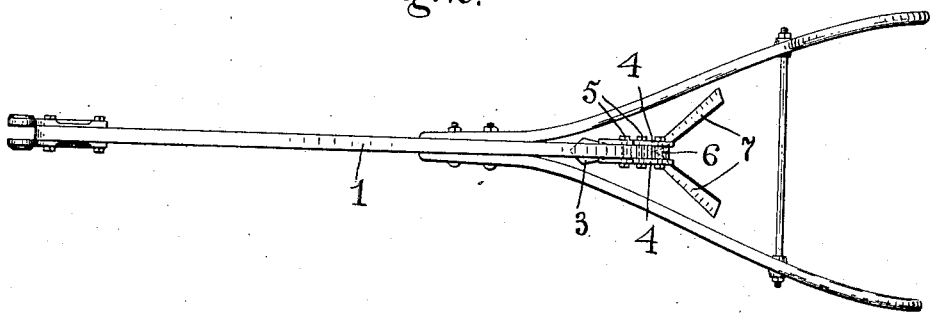

Figure 1 is a side elevation. Fig. 2 a plan view.

Referring by reference characters to this drawing the numeral 1 designates a beam which may be of the ordinary or any desired construction and which is provided at the rear end with a downwardly depending standard 2, terminating in a point 3. The point is preferably slightly wider than the standard and is sharpened to produce an edge which will pass through the soil with the least resistance. The standard is provided at its upper ends with side plates 4, secured by bolts 5 and in rear of the standards and between these plates are secured the vertical shanks 6 of the sub-soil and the weed-cutting blades 7. These are preferably formed integral with the shanks and diverge outwardly and rearwardly with the forward sharpened cutting edges and their upper surfaces preferably incline slightly upwardly as shown to produce a slight lifting action of the soil which has the effect of loosening it.

The plates and shanks and standards are provided with a plurality of bolt holes as shown by which the parts may be adjusted relatively to each other to secure differences in the working depth and in the lifting action of the blades as desired.

Having thus described my invention, what I claim is:—

In combination, a beam having a standard provided with a soil penetrating point, side plates secured to said standard, and shanks secured between said side plates in rear of the standard and having rearwardly diverging cutting blades at their lower ends in the same horizontal plane as the point of the standard, substantially as described.

In testimony whereof, I affix my signature in presence of two witnesses.

JOHN PIERSON, JR.

Witnesses:
BERTHA J. BROWN,
LUCILE M. BROWN.